(12) United States Patent
Sladecek et al.

(10) Patent No.: US 9,109,960 B2
(45) Date of Patent: Aug. 18, 2015

(54) ESTIMATING TEMPERATURE

(75) Inventors: Marcel Sladecek, Eindhoven (NL);
Michael Tolk, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 358 days.

(21) Appl. No.: 13/580,527

(22) PCT Filed: May 18, 2011

(86) PCT No.: PCT/IB2011/052176
§ 371 (c)(1),
(2), (4) Date: Aug. 22, 2012

(87) PCT Pub. No.: WO2011/145063
PCT Pub. Date: Nov. 24, 2011

(65) Prior Publication Data
US 2013/0048625 A1    Feb. 28, 2013

(30) Foreign Application Priority Data
May 20, 2010    (EP) ..................................... 10163440

(51) Int. Cl.
*H05B 1/02*    (2006.01)
*G01K 7/42*    (2006.01)

(52) U.S. Cl.
CPC .............. *G01K 7/42* (2013.01); *G01K 2207/06* (2013.01)

(58) Field of Classification Search
CPC ..... G01K 7/42; G01K 7/427; G01K 2207/06; G01K 3/04; G05D 23/00; H05B 1/0258; H05B 1/0261
USPC ......... 219/494, 497, 505, 492, 413, 435, 441; 374/102, 103, 107; 700/300, 306
See application file for complete search history.

(56) References Cited

U.S. PATENT DOCUMENTS

| | | | |
|---|---|---|---|
| 5,300,757 A | 4/1994 | Hara et al. | |
| 5,893,051 A | 4/1999 | Tomohiro | |
| 6,111,239 A * | 8/2000 | Park | 219/710 |
| 6,462,316 B1 * | 10/2002 | Berkcan et al. | 219/502 |
| 7,424,069 B1 * | 9/2008 | Nicholls et al. | 375/339 |
| 7,573,005 B2 | 8/2009 | Clothier | |
| 7,596,432 B2 | 9/2009 | Boer et al. | |
| 8,754,351 B2 * | 6/2014 | England et al. | 219/620 |
| 2008/0034753 A1 * | 2/2008 | Furman et al. | 60/605.1 |
| 2008/0237215 A1 | 10/2008 | Lee et al. | |
| 2010/0012645 A1 | 1/2010 | Baier | |

FOREIGN PATENT DOCUMENTS

| | | |
|---|---|---|
| DE | 19609116 A1 | 9/1997 |
| EP | 0757529 B1 | 6/2000 |
| JP | 2001193941 A | 7/2001 |

* cited by examiner

*Primary Examiner* — Mark Paschall

(57) ABSTRACT

A method of estimating a temperature of a material being heated is described. The method may comprise supplying electrical power to a heating element in dependence on a measured temperature, calculating a rate at which the amount of electrical power supplied changes over time, comparing the calculated rate with a plurality of known values in order to determine the value of a parameter relating to thermal properties of the material being heated, and calculating an estimated temperature based on the determined value of said parameter. In some embodiments, the method may further comprise detecting a drop in temperature of the material being heated, by detecting a change in the calculated rate at which the amount of electrical power supplied changes over time.

15 Claims, 8 Drawing Sheets

ESTIMATING TEMPERATURE

The present invention relates to a method of estimating a temperature. More particularly, the present invention relates to estimating a temperature based on the power supplied to a heating element during a heating operation.

A wide range of kitchen appliances include heating elements, such as kettles, steamers, rice cookers, food processors, soup warmers and so on. In such appliances, it is usually desirable to accurately control the temperature to which food is heated, in order to ensure that it is neither undercooked nor overcooked. To this end, heating appliances are typically provided with a temperature sensor to monitor a temperature of the heating element. The power supply to the heating element is controlled in order to maintain this temperature within a predetermined range.

FIG. 1 illustrates a conventional system for heating food. The system comprises a cooking surface 101, below which is disposed a heating element 102. A temperature sensor 103 is arranged to monitor a temperature of the heating element 102. The system further comprises a power supply 104 for providing electrical power to the heating element 102, and a control unit 105 for reading a temperature from the temperature sensor 103 and displays the temperature on a display 106. The material 108 to be heated (i.e. the foodstuff which is to be cooked) is held within a container 107, which is heated by the heating element 102.

An additional temperature sensor 109 is provided on an inner surface of the container 107. This additional temperature sensor 109 is connected to an RFID tag (not shown), which transmits information about the current temperature of the foodstuff 108 to the control unit 105 via a wireless data connection 110. The control unit may then display a current temperature of the foodstuff 108 on the display 106, in order to allow a user to monitor a current temperature of the foodstuff 108. However, the cost and complexity of the system is increased by the need to provide an additional temperature sensor 109 and connection 110 to the control unit 105.

US 2008/0237215 A1 discloses a method of controlling a cooking apparatus, in which the duty cycle of a heat source is increased when a load is present, and reduced when there is no load. DE 19609116 A1 discloses a method of cooking food in which a core temperature of the food is measured. US 2010/0012645 A1 discloses a temperature probe for use in an oven, the probe including a transmitter and a thermogenerator for powering the transmitter.

The present invention aims to address the drawbacks inherent in known arrangements.

According to the present invention, there is provided a method of estimating a temperature of a material being heated and an apparatus for estimating the temperature of a material being heated.

According to the present invention, there is provided a method of estimating a temperature of a material being heated, the method comprising supplying electrical power to a heating element in dependence on a measured temperature, calculating a rate at which the amount of electrical power supplied changes over time, comparing the calculated rate with a plurality of known values in order to determine the value of a parameter relating to thermal properties of the material being heated, and calculating an estimated temperature based on the determined value of said parameter.

Supplying electrical power to the heating element may comprise repeatedly switching the supplied power on and off in dependence on the measured temperature.

The method may further comprise applying a moving-average filter to recorded data about the supplied electrical power, before calculating the rate at which the amount of electrical power supplied changes over time.

The estimated temperature may be calculated based on the equation $$T = T_f + (T_0 - T_f) * \exp\left(\frac{-t}{B}\right)$$

wherein T is the estimated temperature, $T_0$ is a starting temperature, $T_f$ is a preset temperature, t is an elapsed time since the start of heating, and B is the parameter relating to thermal properties of the material being heated.

The measured temperature may be a temperature of the heating element or of an interface layer between the heating element and a container containing the material being heated, e.g. a cooking surface.

Supplying electrical power to the heating element may comprise supplying electrical power so as to maintain a value of the measured temperature within a predetermined temperature range.

The method may further comprise detecting a temperature drop of the material being heated, by detecting a change in the calculated rate at which the amount of electrical power supplied changes over time.

The method may further comprise recalculating the estimated temperature after detecting the temperature drop, based on recorded data about the supplied electrical power before and after the temperature drop.

According to the present invention, there is also provided apparatus for estimating the temperature of a material being heated, the apparatus comprising a container arranged to contain the material to be heated, a heating element, a power supply arranged to supply electrical power to the heating element, a temperature sensor arranged to measure a temperature, and a control unit arranged to control the supply of electrical power to the heating element in dependence on the measured temperature, wherein the control unit comprises a first calculator arranged to calculate a rate at which the amount of electrical power supplied changes over time, a comparator arranged to compare the calculated rate with a plurality of known values in order to determine the value of a parameter relating to thermal properties of the material being heated, and a further calculator arranged to calculate an estimated temperature based on the determined value of said parameter.

The apparatus may further comprise a switching unit connected between the power supply and the heating element, the switching unit being switchable between an ON state in which electrical power is supplied to the heating element and an OFF state in which electrical power is not supplied to the heating element, wherein the control unit may be arranged to repeatedly switch the switching unit between the ON and OFF states in dependence on the measured temperature.

The control unit may further be arranged to apply a moving-average filter to recorded data about the supplied electrical power, before calculating the rate at which the amount of electrical power supplied changes over time.

The temperature sensor may be disposed in close proximity to the heating element so as to measure a temperature of the heating element or of an interface layer between the heating element and the container, such as a cooking surface.

The control unit may be arranged to supply electrical power to the heating element so as to maintain a value of the measured temperature within a predetermined temperature range.

The control unit may be arranged to detect a temperature drop of the material being heated, by detecting a change in the calculated rate at which the amount of electrical power supplied changes over time.

The control unit may be further arranged to recalculate the estimated temperature after detecting the temperature drop, based on recorded data about the supplied electrical power before and after the temperature drop.

Embodiments of the invention will now be described, by reference to the accompanying drawings, in which:

FIG. 1 schematically illustrates a conventional system for measuring the temperature of a heated material;

Figure 11:
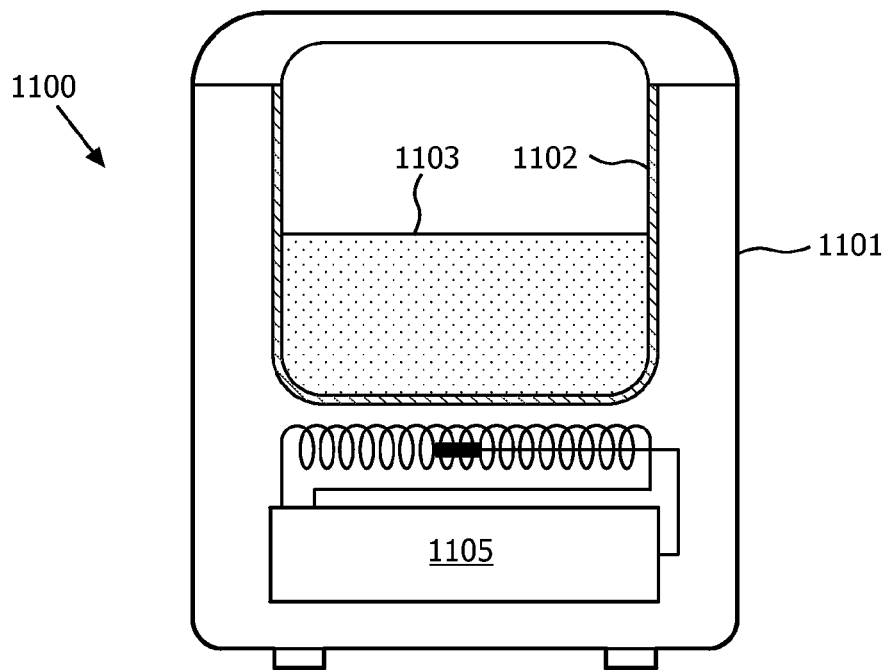
Figure 12:
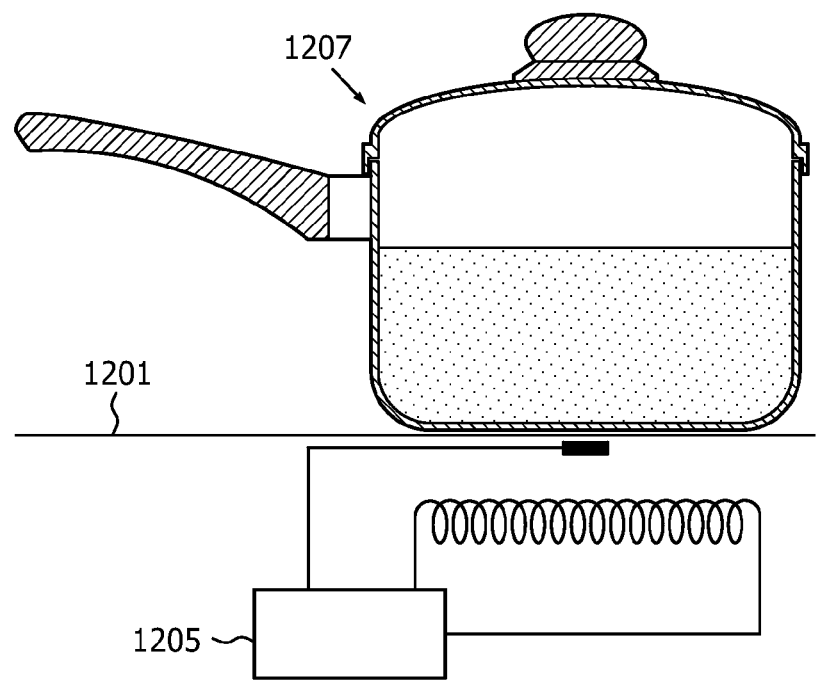
Figure 13:
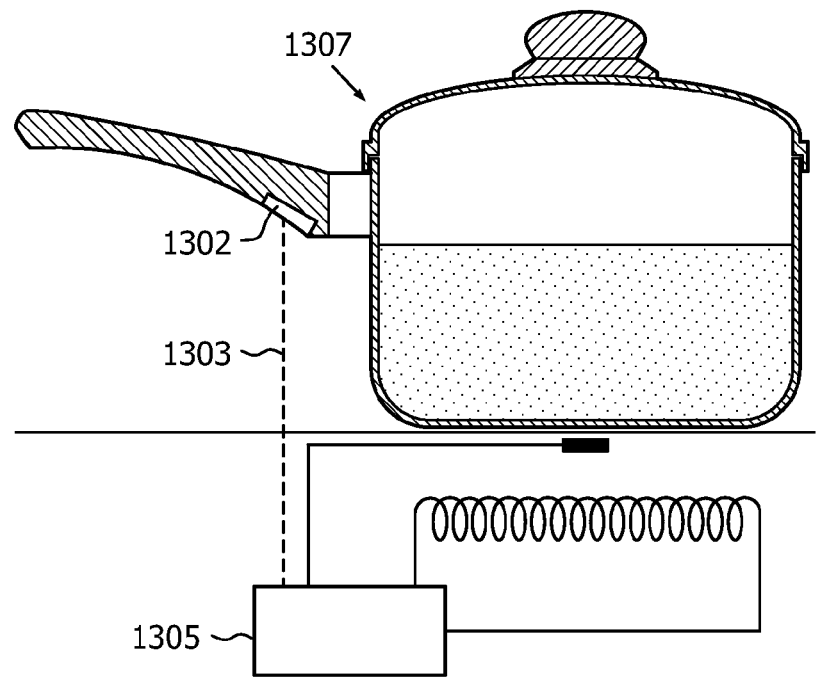

FIG. 11 schematically illustrates a system according to an embodiment of the invention;

FIG. 12 schematically illustrates a system according to an embodiment of the invention; and FIG. 13 schematically illustrates a system according to an embodiment of the invention.

Figure 2:
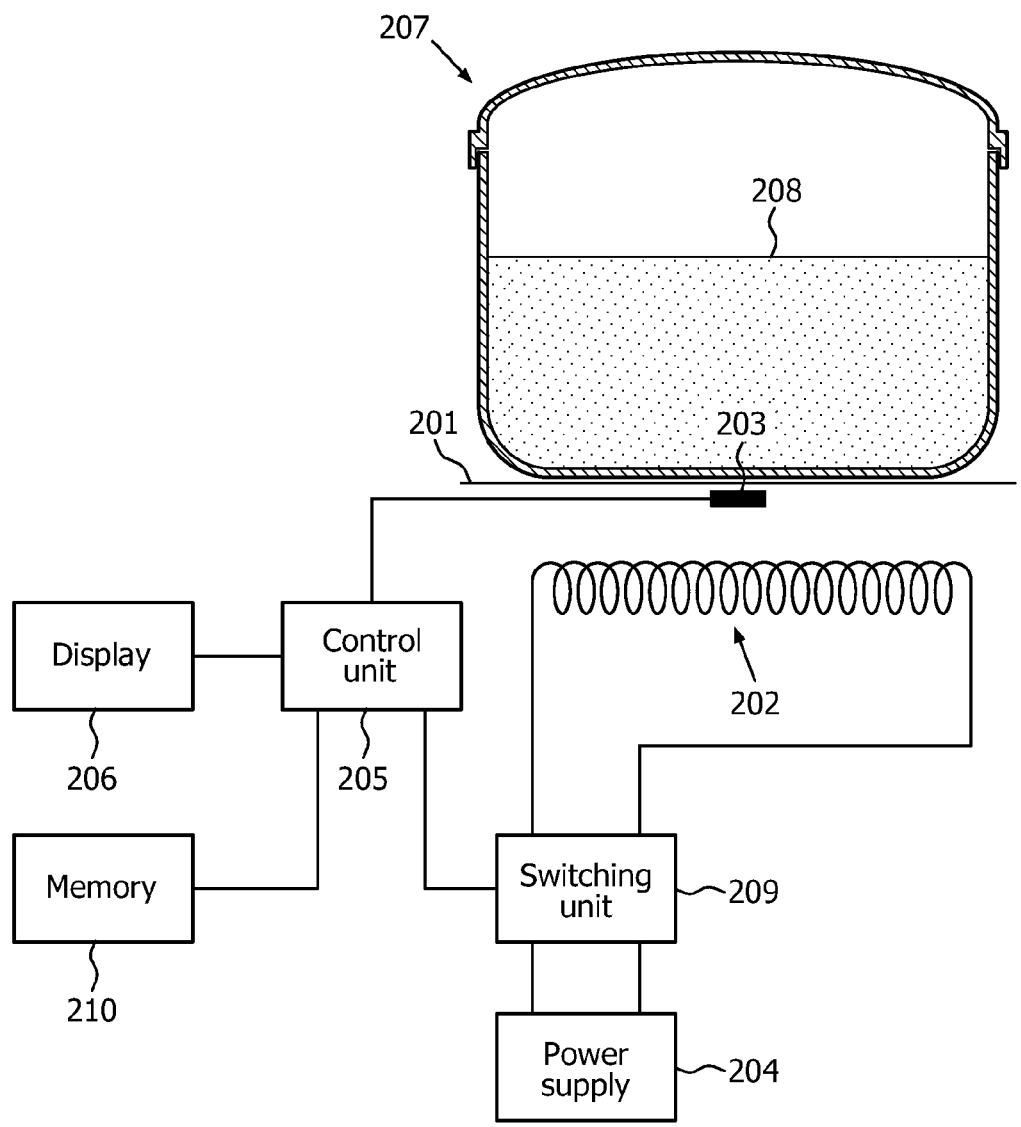
FIG. 2 illustrates a system according to an embodiment of the invention.

Referring now to FIG. 2, a system is illustrated according to an embodiment of the present invention. The system comprises a heating surface 201, a heating element 202, a temperature sensor 203, a power supply 204, a control unit 205, and a display 206. A container 207 is placed in contact with the heating surface 201 in order to heat the contents 208 of the container 207. In the present embodiment, the contents 208 comprise a liquid, but in other embodiments the contents may comprise a solid or a mixture of liquids and solids.

The system further comprises a switching unit 209 connected between the power supply 204 and the heating element 202. The control unit 205 is arranged to control the switching unit 209 to intermittently interrupt the supply of power to the heating element 202, according to the temperature sensed by the temperature sensor 203. By providing power intermittently in this way, a temperature of the heating element 202 may be maintained within a desired temperature range. A temperature overshoot, which could result in burning of material in close proximity to the heating element, may also be prevented. This technique will be described later in more detail.

Figure 1:
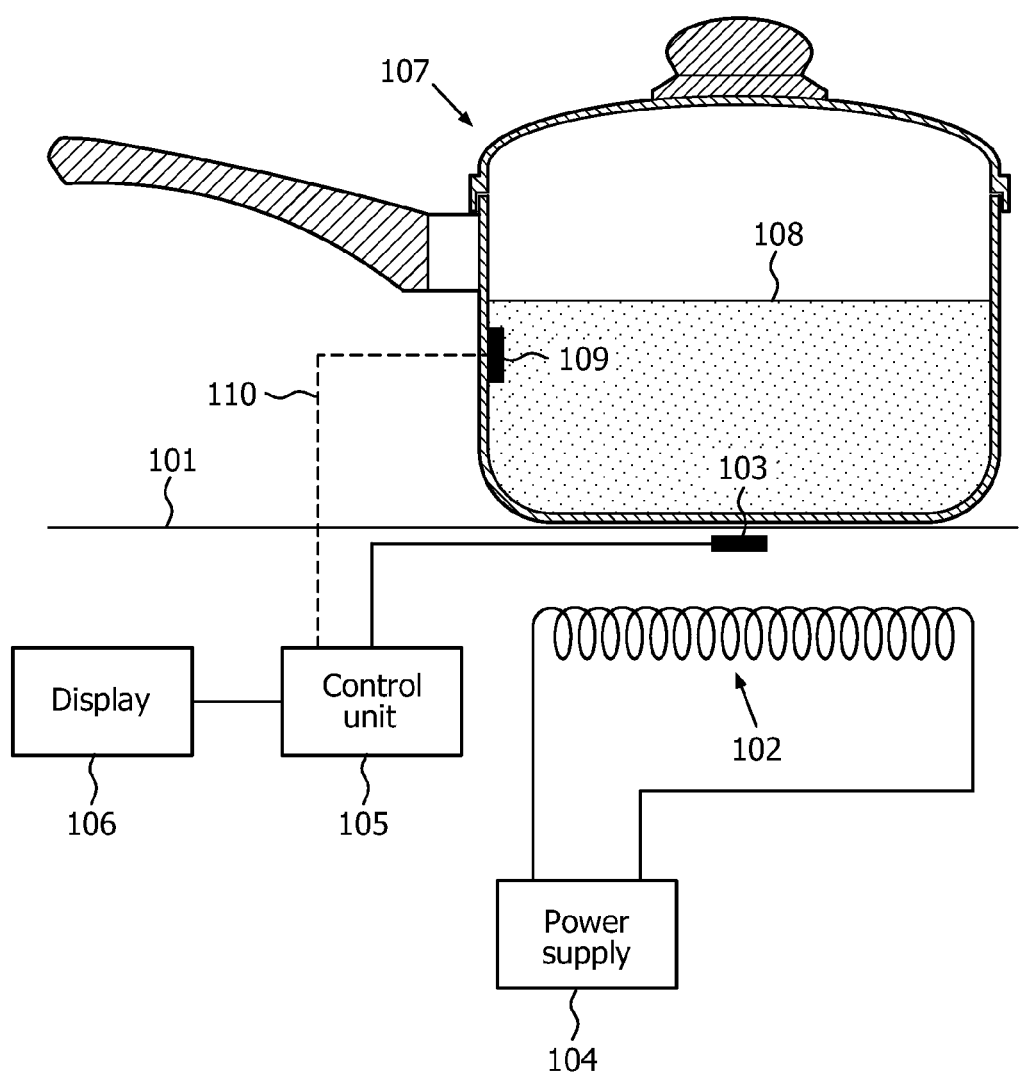

Unlike the conventional system illustrated in FIG. 1, in the present embodiment there is no temperature sensor arranged to directly sense a temperature of the contents 208. Instead, a memory 210 is provided for storing information about a correlation between heating power curves and thermal properties of the contents 208. The control unit 205 is arranged to monitor the power provided to the heating element 202 during heating, and use this information in conjunction with the information stored in the memory 210 to estimate the value of a parameter describing the thermal properties of the contents 208. The control unit 205 is then able to calculate an estimated current temperature of the contents 208, and display this estimated current temperature on the display 206.

Therefore, in the present embodiment, the control unit 205 is able to derive a current temperature of the contents 208 being heated, without requiring an additional temperature sensor to be provided in direct contact with the contents 208. Furthermore, in embodiments where a container is provided as a separate unit from a unit housing the heating element and other components, a wireless connection between the container and the control unit can be omitted.

A method by which the control unit 205 can calculate an estimated current temperature of the contents 208 will now be described with reference to FIGS. 3 to 6.

Figure 3:
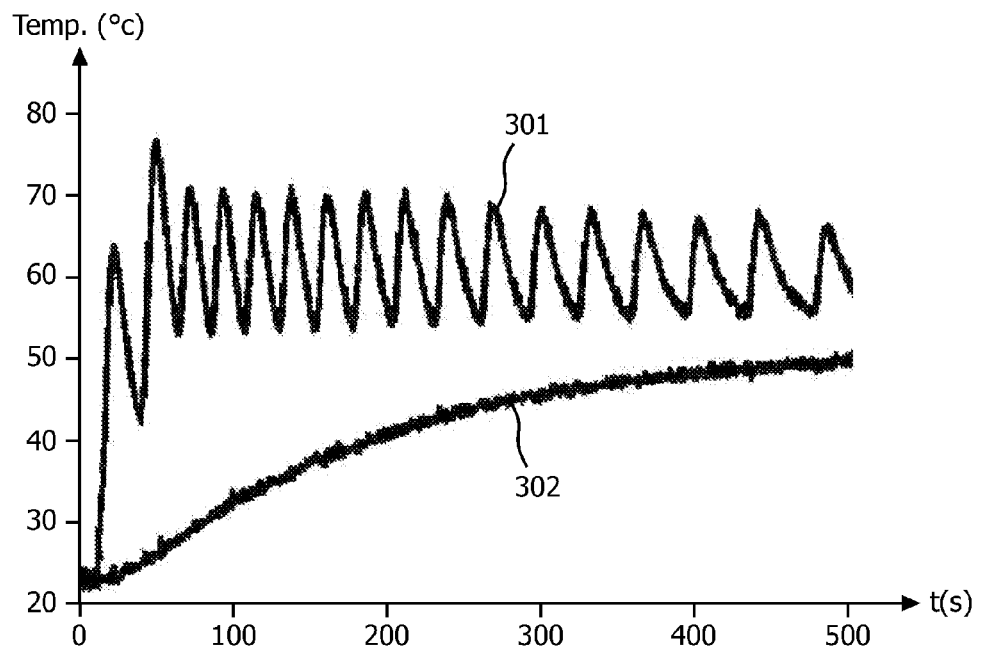
FIG. 3 is a graph illustrating temperature versus time plots for a heating element and a material being heated, according to an embodiment of the invention.

Referring to FIG. 3, a graph is shown illustrating curves of temperature versus time for a heating element and a material being heated, according to an embodiment of the present invention. A first curve 301 shows the temperature detected by a temperature sensor placed in close proximity to the heating element (cf. the temperature sensor 203 of FIG. 2). This temperature repeatedly rises and falls as a result of power being intermittently supplied to the heating element, since a control unit switches the supplied power on or off according to the measured temperature of the heating element.

A second curve 302 shows the temperature of the contents of a container which is being heated by the heating element. This curve is provided for reference and is obtained during a calibration procedure by means of an additional temperature sensor, which is placed in direct contact with the material being heated. During a normal heating operation this additional temperature sensor may be omitted (cf. FIG. 2, in which no temperature sensor is arranged to directly measure a temperature of the contents 208).

As shown in FIG. 3, the material being heated (cf. second curve 302) remains at a lower temperature than the heating element (cf. first curve 301), and changes temperature much less rapidly than the heating element. It is therefore not possible to calculate the temperature of the heated material directly from a known temperature of the heating element. However, a user may be more interested in knowing the current temperature of the heated material (e.g. a foodstuff such as soup, rice, pasta etc.) than the heating element itself. Embodiments of the present invention allow the current temperature of the heated material to be estimated by monitoring the power supplied to the heating element, which will vary depending on the thermal properties of the heated material.

Figure 4:
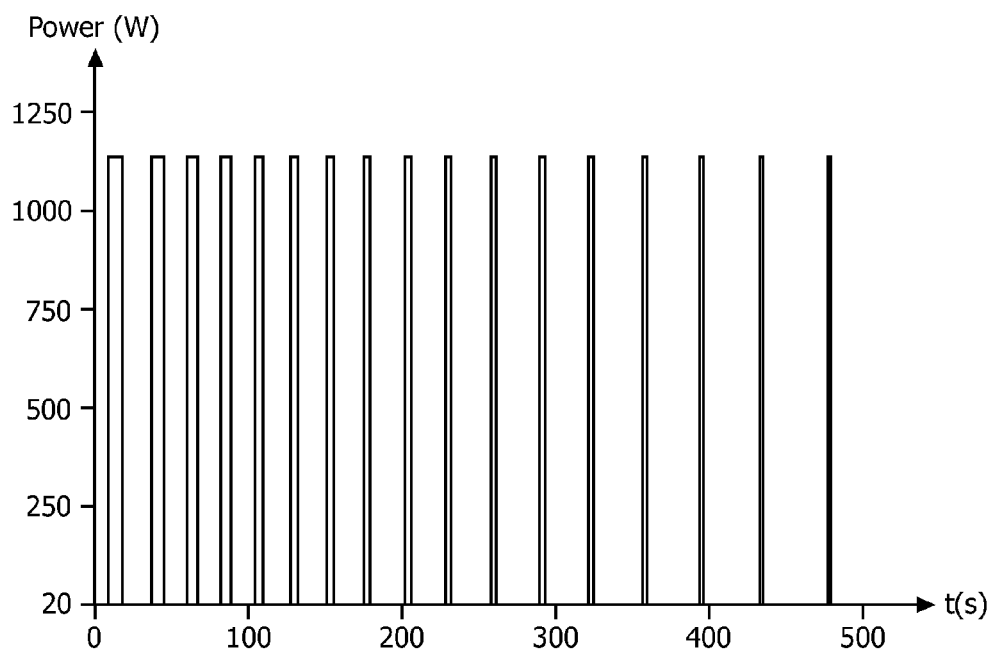
FIG. 4 is a graph illustrating the power supplied to a heating element during the heating operation illustrated in FIG. 3.

Referring now to FIG. 4, a graph is shown illustrating the power supplied to the heating element during the heating operation illustrated in FIG. 3. As shown in FIG. 4, the power is supplied intermittently as the switching unit is repeatedly switched on and off by the control unit (cf. FIG. 2). More specifically, the control unit is arranged to supply the power in short pulses in order to rapidly heat the heating element, with the next pulse being supplied once the measured temperature of the heating element falls to a certain level. During the initial stages of heating, it is necessary to supply a relatively high amount of energy as the material to be heated is at a low temperature. Therefore pulses of relatively long duration are applied at this stage. Furthermore, during the initial heating the container and contents are cool in comparison to the heating element. Therefore the temperature of the heating element drops rapidly when power is not supplied, as energy is quickly transferred to the container and contents. This results in pulses being applied with a high frequency during the initial stages of heating.

As the contents approaches a desired target temperature (about 50° C. in the present embodiment), the contents and heating element are closer in temperature and so heat is conducted away from the heating element less rapidly. Therefore, less energy is required to maintain the temperature of the heating element within a certain temperature range. Hence as the contents approaches the target temperature, the duration and frequency of pulses is reduced.

From the above description, it can be understood that the rate at which power is supplied to the heating element during heating will vary depending on the thermal inertia of the material being heated. For example, a material with a high specific heat capacity and low thermal conductivity will require more energy to be heated to a specific temperature, than a material with a low specific heat capacity and high thermal conductivity.

Figure 5:
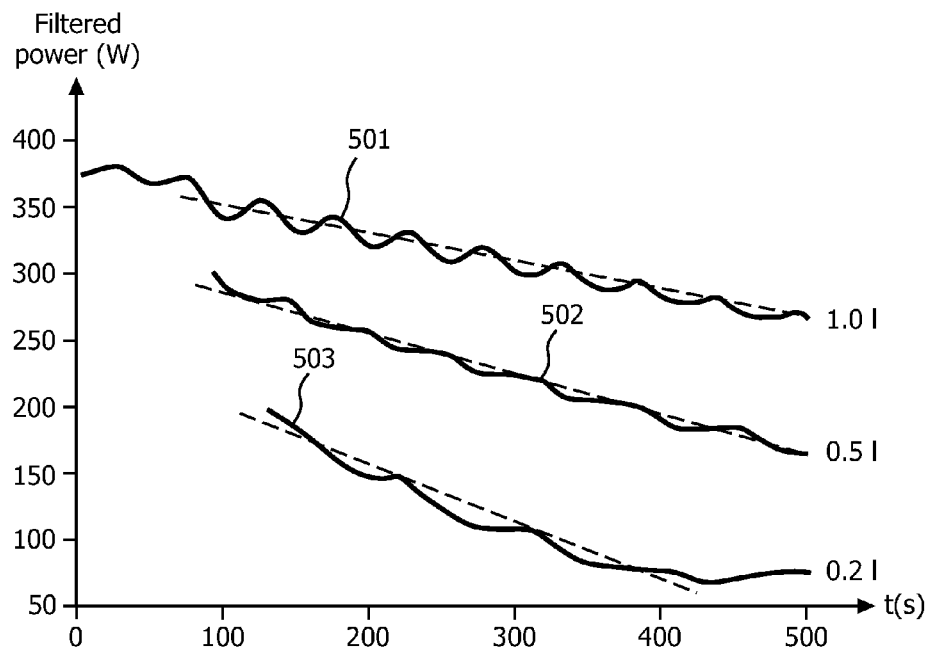
FIG. 5 is a graph illustrating filtered-power curves for different volumes of heated material, according to an embodiment of the invention.

Referring now to FIG. 5, a graph is shown illustrating filtered power curves for different volumes of heated material, according to an embodiment of the present invention. A filtered power curve may be obtained by applying a moving average filter to supplied-power data such as that shown in FIG. 4. The moving average may also be referred to as the floating average, rolling average or rolling mean. In the present embodiment, a moving average is calculated for each point on the curve (i.e. each point in time) by taking the mean value of all points within a certain distance of the current point. The skilled person will be aware of various methods for applying a moving average filter, and so a detailed description will be omitted here in order to maintain brevity.

Applying a moving average filter has the effect of smoothing out the power curve shown in FIG. 4, and substantially removing the periodic fluctuations. The filtered power curves of FIG. 5 therefore provide a clear indication of how the amount of power supplied to the heating element reduces over time, as the heated material approaches the target temperature.

As noted above, the rate at which the amount of power supplied decreases will be dependent on the thermal inertia of the material being heated. The thermal inertia takes into account such factors as volume of material, specific heat capacity, and thermal conductivity. For example, a larger volume of water will have a higher thermal inertia than a smaller volume, since more energy is required to heat the larger volume to any given temperature. In FIG. 5, a first filtered-power curve 501 corresponds to the power supplied during heating of 1.0 liters of water, a second filtered-power curve 502 corresponds to the power supplied during heating of 0.5 liters of water, and a third filtered-power curve 503 corresponds to the power supplied during heating of 0.2 liters of water. Each curve may be fitted to a straight line as shown by the dotted lines in FIG. 5, in order to calculate a gradient. In the present embodiment, the third curve 503 has the highest (i.e. most negative) gradient, since it is quicker to heat 0.2 liters of water than 0.5 liters or 1 liter, and therefore the power supplied decreases more rapidly.

Any given type and/or volume of material may be characterized by a thermal parameter B, which describes the thermal inertia of that material. The value of B may depend not only on the material being heated, but also on other factors such as the thermal properties of a container holding the material. As well as exhibiting a characteristic value of the thermal parameter B, a particular material may also exhibit a characteristic gradient on a filtered-power curve (cf. FIG. 5). Therefore a calibration process may be performed, in which reference values are obtained for different samples for both the thermal parameter B and the filtered-power gradient. In embodiments of the present invention, these reference values may be stored in a lookup table in a non-volatile memory (cf. the memory 210 of FIG. 2).

Figure 6:
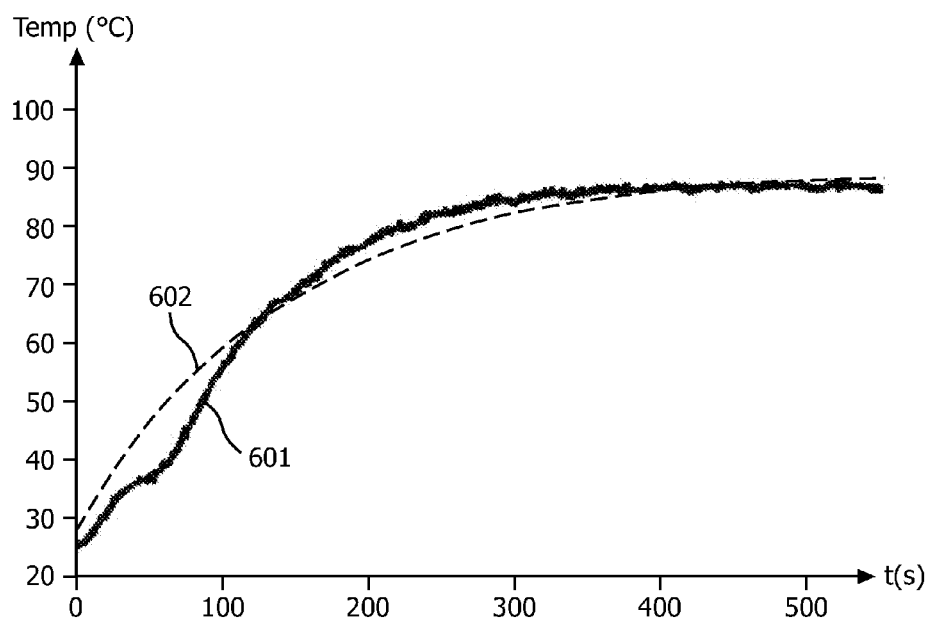
FIG. 6 is a graph illustrating curves of estimated temperature and actual temperature against time, according to an embodiment of the invention.

Referring now to FIG. 6, a graph is shown which illustrates curves of estimated temperature and actual temperature against time, according to an embodiment of the present invention. A first curve 601 (solid line) illustrates measured data for the actual temperature of a material being heated, whilst a second curve 602 (dot-dash line) illustrates estimated temperature data obtained according to an embodiment of the present invention. The estimated temperature curve 602 may be obtained by a control unit monitoring the power supplied to a heating element during a heating operation, applying a moving average filter to the supplied-power data, calculating a gradient of the filtered-power curve, and referring to a lookup table stored in a memory in order to obtain a value of the thermal parameter B associated with the calculated gradient. In the present embodiment, once a value is obtained for the thermal parameter B, the estimated temperature T at a given time t (i.e. a time after beginning the heating operation) may be obtained by using the equation $$T = T_f + (T_0 - T_f) * \exp\left(\frac{-t}{B}\right),$$

wherein $T_0$ is a starting temperature and $T_f$ is a target temperature (which may be set by a user).

In the present embodiment, the starting temperature $T_0$ is a temperature measured by the temperature sensor at the start of the heating operation, i.e. at t=0. At t=0, the heating element has not yet been turned on, and is cool. As a result, the temperature of the heating element does not significantly affect the measured temperature at t=0. The measured starting temperature may therefore correspond closely to an actual temperature of the contents, as the temperature sensor is arranged to be in good thermal contact with the contents as well as the heating element.

However, in other embodiments of the present invention the step of measuring a starting temperature may be omitted. For instance, certain embodiments of the present invention may be designed for use with a particular type of material, which is typically stored at a specific temperature. In such cases, the control unit may be arranged to assume that the starting temperature corresponds to this specific temperature. For example, if the system is designed to heat food from frozen, the starting temperature may be assumed to be −17° C. If the system is designed to heat chilled food typically stored in a fridge, the starting temperature may be assumed to be 2° C. If the system is designed to heat food typically stored at room temperature, the starting temperature may be assumed to be 20° C.

As shown in FIG. 6, the estimated temperature of the material being heated shows a good agreement with the actual (i.e. measured) temperature at any point. The slight discrepancy in the initial stage of heating is due to an overshooting algorithm employed by a control unit to control the heating element, in the present embodiment.

During the calibration process, values of B may be determined empirically for each type and/or volume of material. Specifically, during calibration, a heating curve may be obtained by directly measuring the temperature of the material. Using the above equation, a value of B can then be determined which provides the best fit to the actual measured temperature curve.

In certain embodiments of the present invention, the control unit may be arranged to wait until a predetermined number of data points have been recorded before calculating an estimated temperature. This may ensure that the estimated temperature is calculated with a desired degree of accuracy. As an example, the control unit may wait until several hundred data points have been recorded.

In the present embodiment, the control unit is arranged to record data about the supplied power at a sampling rate of 5 Hz, i.e. every 0.2 s the control unit records the level at which power is being supplied to the heating element. The control unit is further arranged to begin calculating an estimated temperature after approximately three on/off cycles of the heating element. As shown in FIGS. 3 and 4, in the present embodiment these cycles have a period of approximately 25 s, meaning that the control unit waits until approximately 375 data points have been recorded before calculating an estimated temperature. The control unit then recalculates the estimated temperature at regular intervals in order to regularly provide an updated temperature estimate to a user.

In other embodiments of the present invention however, the control unit may be arranged to only calculate the estimated temperature in response to a user request to display the estimated temperature. Alternatively, other embodiments of the present invention may not display the estimated temperature to a user at all, but may instead automatically modify the heating operation based on the estimated temperature, for example by using a feedback loop to maintain the estimated temperature at a constant value.

Figure 7:
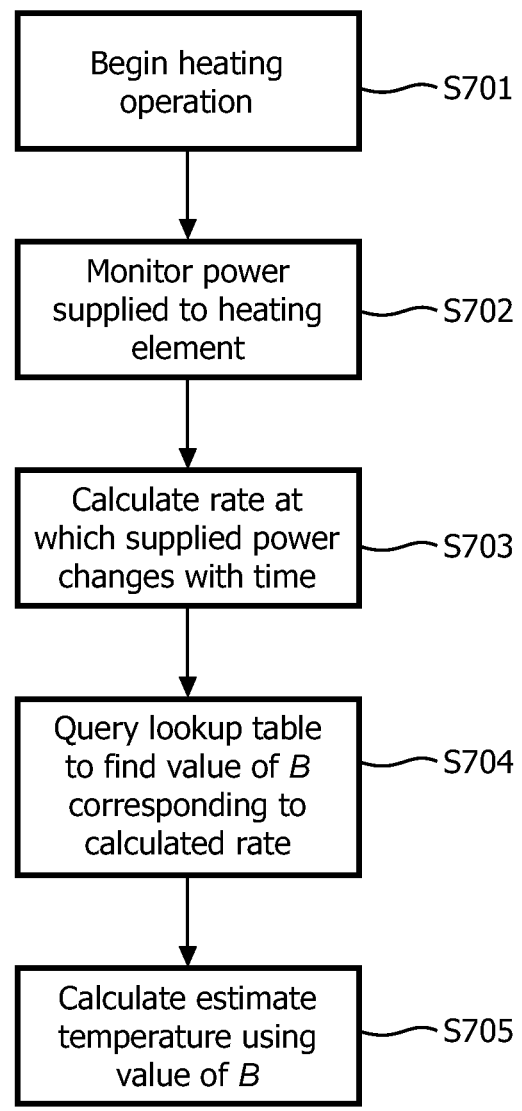
FIG. 7 is a flowchart illustrating a method of estimating the temperature of a heated material, according to an embodiment of the invention.

Referring now to FIG. 7, a flowchart is shown illustrating a method of estimating the temperature of a heated material, according to an embodiment of the present invention. Starting at step S701, a system begins a heating operation in order to heat a foodstuff to a desired temperature. Next, moving to step S702 the system monitors the power supplied to the heating element. In the present embodiment, monitoring the power supplied comprises periodically recording a level at which power is currently supplied to the heating element. By recording a plurality of values over a certain period of time, the system accumulates a set of data which illustrates how the supplied power varies with time.

Next, at step S703, the system processes the recorded data about supplied power in order to calculate a rate at which the supplied power changes with time. In the present embodiment, this step comprises applying a moving-average filter to the recorded data in order to substantially smooth out the large fluctuations as the power is cycled on/off. After applying the moving-average filter, the system calculates the gradient of a straight line which offers the best fit to the filtered-power curve (cf. FIG. 5).

Next, at step S704, the system queries a lookup table stored in the memory, in order to find a value of the thermal parameter B which corresponds to the rate calculated in step S703. Finally, at step S705 the system uses this retrieved value of B to calculate an estimated current temperature of the material being heated. The system may then display this estimated temperature to a user. In certain embodiments, in addition to or instead of displaying the estimated temperature, the estimated temperature may be used to adjust the control of the heating element in order to accurately maintain the heated material at a desired temperature.

Figure 8:
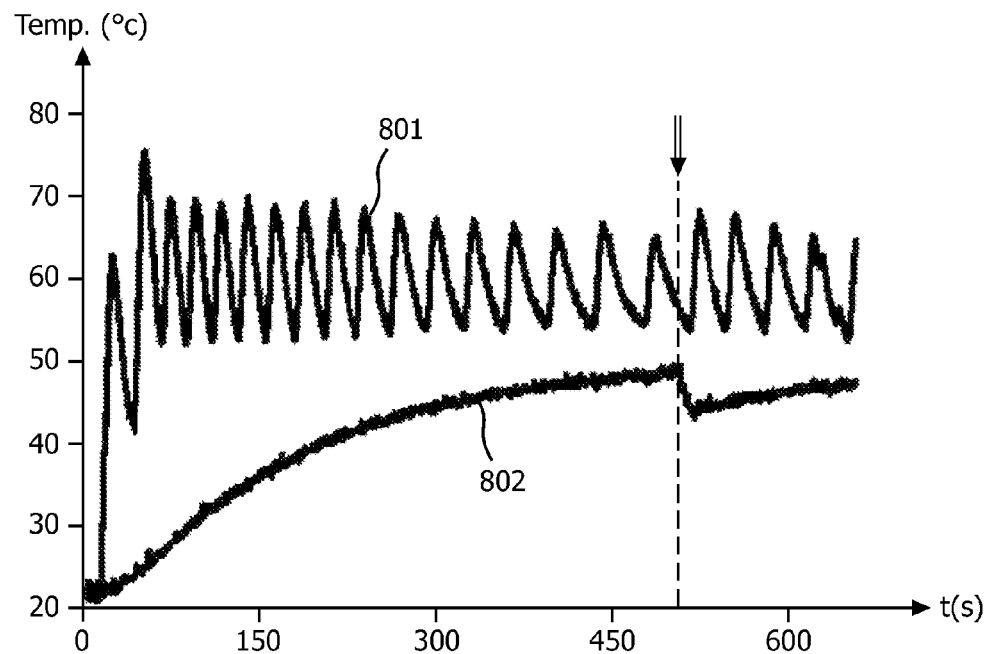
FIG. 8 illustrates a temperature drop during a heating operation, according to an embodiment of the invention.

Referring now to FIG. 8, a graph is shown illustrating a temperature drop during a heating operation, according to an embodiment of the present invention. The heating operation is similar in many respects to that described earlier in relation to FIGS. 3 and 4, and so a detailed description will be omitted here in order to maintain brevity. Briefly, FIG. 8 illustrates a first curve 801 showing a temperature of a heating element during a heating operation, and a second curve 802 showing the measured temperature of a material being heated.

In the present embodiment, at about 500 s the temperature of the material being heated decreases suddenly by about 5° C. This is due to the addition of colder material to the heating container. Furthermore, as shown in FIG. 8, it is not possible to detect this temperature drop simply by monitoring a temperature of the heating element (cf. first curve 801), since addition of the cool material has little or no effect on the temperature of the heating element. However, the corresponding decrease in temperature of the heated material may be detected by monitoring the power supplied to the heating element, as will now be described with reference to FIGS. 9 and 10.

Figure 9:
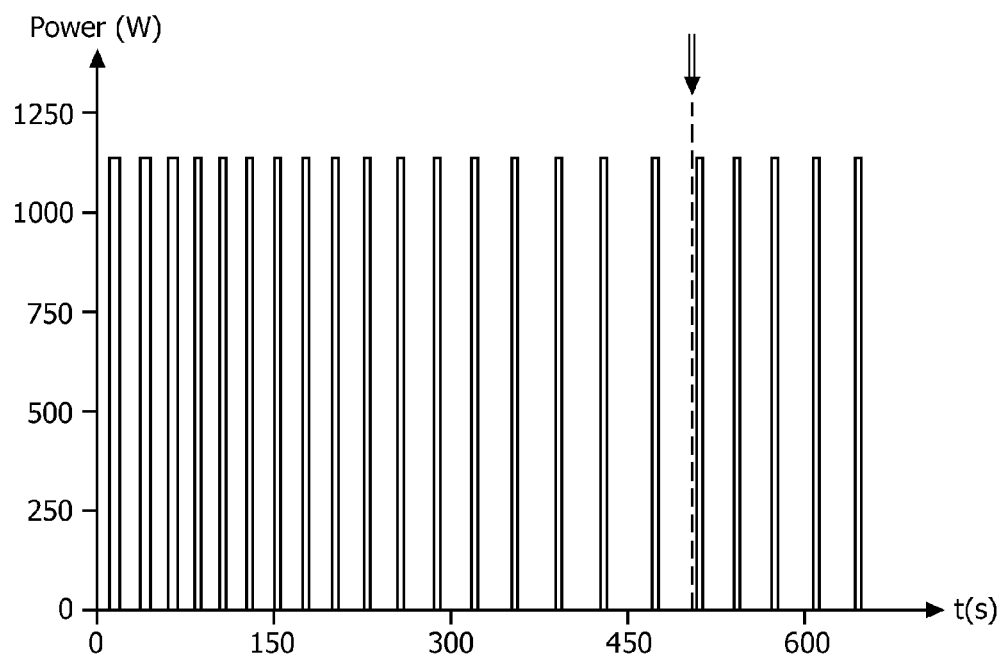
FIG. 9 is a graph illustrating the power supplied to a heating element during the heating operation illustrated in FIG. 8.

FIG. 9 illustrates the power supplied to a heating element during the heating operation illustrated in FIG. 8. The dotted line at about 500 s indicates the point at which additional colder material is added to the material being heated. As this results in an increase in the mass of material to be heated, as well as an overall decrease in temperature, it becomes necessary to supply more power in order to bring the material back up to the target temperature and maintain it at the target temperature. Hence after the addition of colder material at about 500 s, there follows a corresponding increase in pulse frequency of the power supplied to the heating element.

Figure 10:
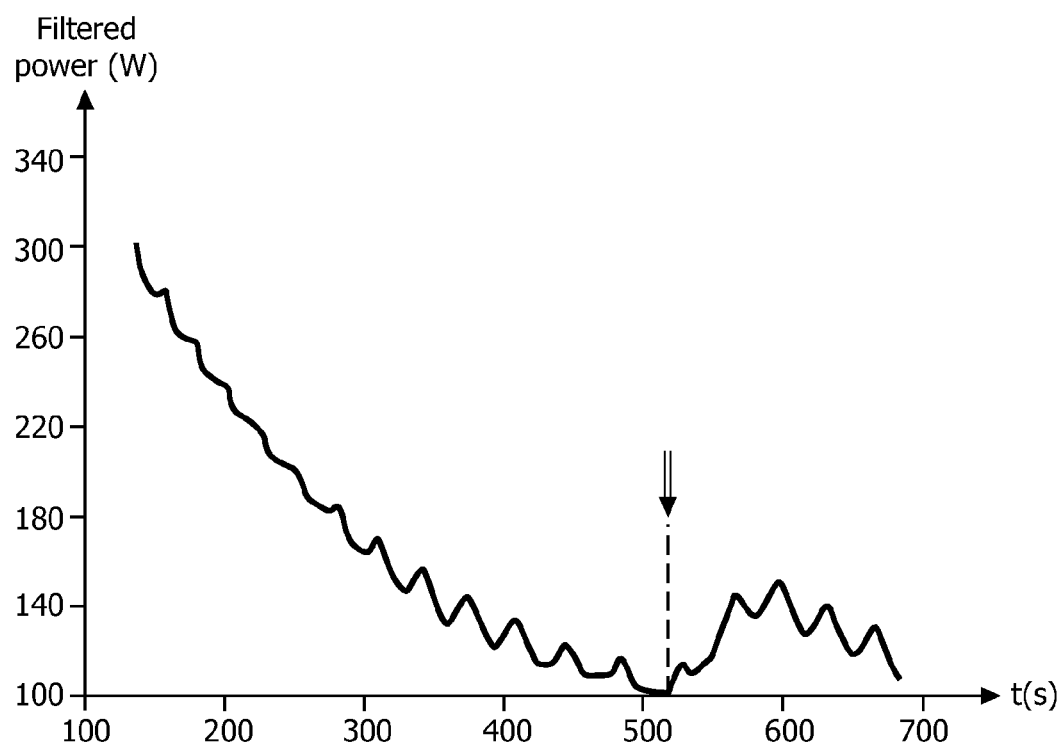
FIG. 10 is a graph illustrating a filtered-power curve for the heating operation illustrated in FIG. 8.

FIG. 10 illustrates a filtered-power curve for the heating operation illustrated in FIG. 8, obtained by applying a moving-average filter to the data shown in FIG. 9. There is a significant increase in the filtered-power signal following the addition of the colder material at about 500 s. Therefore the system is able to detect the temperature drop and control a display to indicate this temperature drop to a user, even though a temperature sensor provided for controlling the heating element is not sensitive enough to detect the temperature drop directly.

After detecting a temperature drop, the system may recalculate the estimated temperature. In the present embodiment, the control unit is arranged to wait until one on/off cycle of the power supply has been completed, after the temperature drop has been detected. At this point, a moving-average filter is applied to data from both before and after the point at which the temperature drop was detected, and the estimated temperature is calculated based on the resulting filtered-power curve.

Therefore although the control unit may wait for several on/off cycles at the start of the heating operation before calculating an estimated temperature, when a temperature drop is detected an updated temperature can be calculated more quickly. This is because supplied-power data prior to the temperature drop is available, whereas no such data is available before the start of a heating operation.

As an example, the control unit may be arranged to calculate a new estimated temperature soon after the temperature drop by assuming that a value of the thermal parameter B is unchanged from before the temperature drop. As more data is accumulated, the control unit may recalculate the gradient after the temperature drop (e.g. after 3 on/off cycles following the temperature drop), and retrieve an updated value of the thermal parameter B.

Referring now to FIG. 11, a system 1100 is schematically illustrated according to an embodiment of the present invention. For clarity in FIG. 11, elements such as the control unit, power supply, display, memory and switching unit (cf. FIG.

2) are illustrated as a single control block 1105. The system 1100 comprises a body 1101 which is formed with a recess for receiving a container 1102 holding the foodstuff 1103 to be cooked. In the present embodiment, the container 1102 is formed separately to the body 1101 such that the container may be removed, for example in order to allow the container to be easily emptied and cleaned. However, in other embodiments, the container may be formed integral to the body. A system such as the one illustrated in FIG. 11 may offer an advantage in that the body 1101 may be adapted to only receive a specific container 1102. In this way, it can be ensured that the same container 1102 is always used during a heating operation, and so the system may be accurately calibrated to this particular container 1102. Therefore the accuracy with which a current temperature of the material being heated (i.e. the foodstuff 1103) may be calculated can be improved, since the thermal properties of the container may be substantially constant, and so any change in the gradient of the filtered-power curve (cf. FIG. 5) may be attributed to the foodstuff 1103.

Referring now to FIG. 12, a system is illustrated according to an embodiment of the present invention. In the present embodiment, a heating surface 1201 of the system comprises a cooking surface such as an electric hob, and the container 1207 comprises a saucepan. This system may allow a range of different containers to be used. As the measured gradient of a filtered-power curve (cf. FIG. 5) may be dependent on the thermal properties of the container as well as the material being heated, in certain embodiments the system may be restricted to use with containers from a particular range of cookware, in which the different containers are arranged to have similar thermal properties.

Referring now to FIG. 13, a system is illustrated according to an embodiment of the present invention. The system is similar to the one illustrated in FIG. 12, but differs in that the container 1307 comprises an RFID tag 1302 for transmitting information about the container 1307 to the control block 1305 via a wireless data connection 1303. This system may be suitable for use with a plurality of different containers, each having substantially different thermal properties. The RFID tag 1302 may store information for identifying the particular container 1307, or for providing specific information about the thermal properties of the container 1307. The control block 1305 may receive this information from the RFID tag 1302, and interpret a measured gradient of the filtered-power curve (cf. FIG. 5) based on the received information. For example, during configuration of the system, a lookup table may be provided with a plurality of data corresponding to different classes of container, with the RFID tag 1302 providing information identifying a class to which the particular container 1302 belongs. The control block 1305 may then be arranged to search in a particular section of the lookup table corresponding to the identified class.

This system may offer an advantage in that even when containers with substantially different thermal properties are used, the system may still be able to accurately calculate an estimated current temperature of a material being heated, by receiving information which can be used to identify the particular container being used. Although in the present example this information is stored in an RFID tag, the skilled person will appreciate that other arrangements may be used. For example, the container 1307 and heating surface may be provided with metal-to-metal contacts for forming a direct wired connection between the control block 1305 and a memory unit within the container 1307.

Whilst certain embodiments of the present invention have been described above, it will be clear to the skilled person that many variations and modifications are possible while still falling within the scope of the invention as defined by the claims.

For example, embodiments of the present invention have been described in which a heating element is controlled by repeatedly switching on or off a connection to a power supply, according to a measured temperature of the heating element. However, in other embodiments, a variable power supply may be used, in which case the switching unit may be omitted and the control unit may control the power supply directly. In such embodiments, it may be possible to calculate a gradient directly from a curve of supplied-power against time, and so the step of applying a moving-average filter may be omitted. Furthermore, it is not necessary to wait for several on-off cycles and apply a moving-average filter to generate a smooth curve from which a gradient can be calculated. Therefore it may be possible to calculate an estimated temperature earlier in the heating operation, and more rapidly after a temperature drop, in comparison to embodiments in which a switching power supply is used.

Additionally, embodiments of the present invention have been described in which a temperature sensor is provided in close proximity to a heating element, in order to measure a temperature of the heating element. However, in other embodiments the temperature sensor may not directly measure the temperature of the heating element itself. For example, the temperature sensor may measure a temperature which is slightly less than a temperature of the heating element, when the temperature sensor is separated from the heating element by an air gap. Provided that the temperature is sensed at a similar location during calibration and during normal use, such differences can be accounted for and may not adversely affect the accuracy with which a temperature is estimated.

Furthermore, although embodiments of the present invention have been described in relation to cooking appliances, in other embodiments the heated material may not be a foodstuff. For example, an embodiment of the present invention may comprise a facial steamer, in which the heated material comprises water. In general, embodiments of the present invention may allow the temperature of any heated material to be estimated.

Use of the verb "comprise" and its conjugates does not exclude the presence of elements other than those stated in a claim or in the description. Use of the indefinite article "a" or "an" preceding an element or step does not exclude the presence of a plurality of such elements or steps. The Figures and description are to be regarded as illustrative only and do not limit the subject matter. Any reference sign in the claims should not be construed as limiting the scope.

The invention claimed is:

1. A method of estimating a temperature of a material in a container being heated by a heating element, the method comprising:
  sensing a temperature proximate the heating element;
  controlling a varying supply of electrical power to the heating element to maintain a predetermined dependence of the electrical power supplied on the sensed temperature;
  calculating a rate at which the supplied electrical power varies with time;
  determining a thermal inertia parameter value for the material being heated by comparing the calculated rate of variation supplied power with a plurality of known rates for maintaining said predetermined dependence on the sensed temperature, said known rates corresponding with respective known thermal inertia parameter values; and estimating the temperature of the material being heated based on data including the determined thermal inertia parameter value.

2. The method of claim 1, where the varying supply of electrical power to the heating element is controlled by repeatedly switching the supplied electrical power on and off to maintain said predetermined dependence on the sensed temperature.

3. The method of claim 2 comprising applying a moving-average filter to power data representing the varying supply of electrical power and calculating an average rate at which said supply of electrical power varies with time.

4. The method of claim 1 where the estimated temperature is calculated based on the equation:

$$T = T_f + (T_0 - T_f) * \exp\left(\frac{-t}{B}\right)$$

where T is the estimated temperature, $T_0$ is a starting temperature, $T_f$ is a preset temperature, t is an elapsed time since the start of heating, and B is the thermal inertia parameter value determined for the material being heated.

5. The method of claim 1 where the sensed temperature is representative of a temperature of at least one of:
the heating element; and
an interface layer located between the heating element and the container.

6. The method of claim 1 where the varying supplying of electrical power to the heating element is controlled to maintain a value of the sensed temperature within a predetermined temperature range.

7. The method of claim 1 including detecting a temperature drop of the material being heated by detecting a change in the calculated rate at which the supplied electrical power varies with time.

8. The method of claim 7 including re-estimating the temperature of the material being heated, after detecting the temperature drop, based on data representing the variation of the supplied electrical power before and after the temperature drop.

9. Apparatus for estimating a temperature of a material in a container being heated, the apparatus comprising:
a heating element arranged for heating the container;
a power supply adapted to controllably supply electrical power to the heating element;
a temperature sensor disposed to sense a temperature proximate the heating element; and
a control unit adapted to:
receive the sensed temperature;
control the supply of power from the power supply to provide a varying supply of electrical power to the heating element to maintain a predetermined dependence of the power supplied on the sensed temperature;
calculate a rate at which the supplied electrical power varies with time;
determine a thermal inertia parameter value for the material being heated by comparing the calculated rate of variation of the supplied power with a plurality of known rates for maintaining said predetermined dependence on the sensed temperature, said known rates corresponding with respective known thermal inertia parameter values; and
estimate the temperature of the material being heated based on data including the determined thermal parameter value.

10. The apparatus of claim 9 comprising a switching unit coupling the power supply to the heating element, said switching unit being switchable between an ON state in which electrical power is supplied to the heating element and an OFF state in which electrical power is not supplied to the heating element, where the control unit is adapted to repeatedly switch the switching unit between the ON and OFF states to maintain said predetermined dependence on the sensed temperature.

11. The apparatus of claim 10 where the control unit is adapted to apply a moving-average filter to power data representing the varying supply of electrical power and to calculate an average rate at which said supply of electrical power varies with time.

12. The apparatus of claim 9 where the temperature sensor is disposed in proximity to the heating element to sense a temperature of at least one of:
the heating element; and
an interface layer located between the heating element and the container.

13. The apparatus of claim 9 where the control unit is adapted to control the varying supply of electrical power to the heating element to maintain a value of the sensed temperature within a predetermined temperature range.

14. The apparatus of claim 9 where the control unit is adapted to detect a temperature drop of the material being heated by detecting a change in the calculated rate at which the supplied electrical power varies with time.

15. The apparatus of claim 14 where the control unit is adapted to re-estimate the temperature of the material being heated, after detecting the temperature drop, based on data representing the variation of the supplied electrical power before and after the temperature drop.

* * * * *